Nov. 21, 1967     O. S. JENSEN     3,353,666
GASKET PACKAGE
Filed Oct. 11, 1965
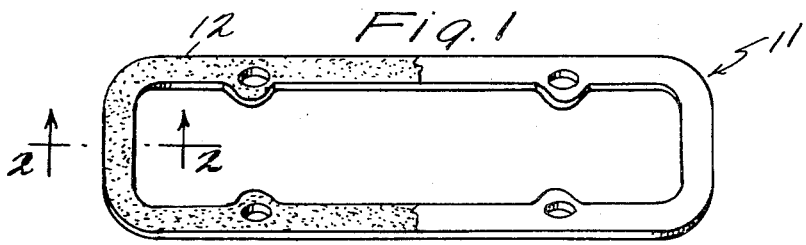
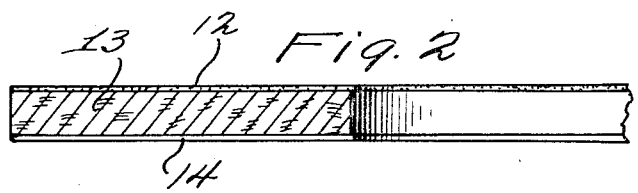
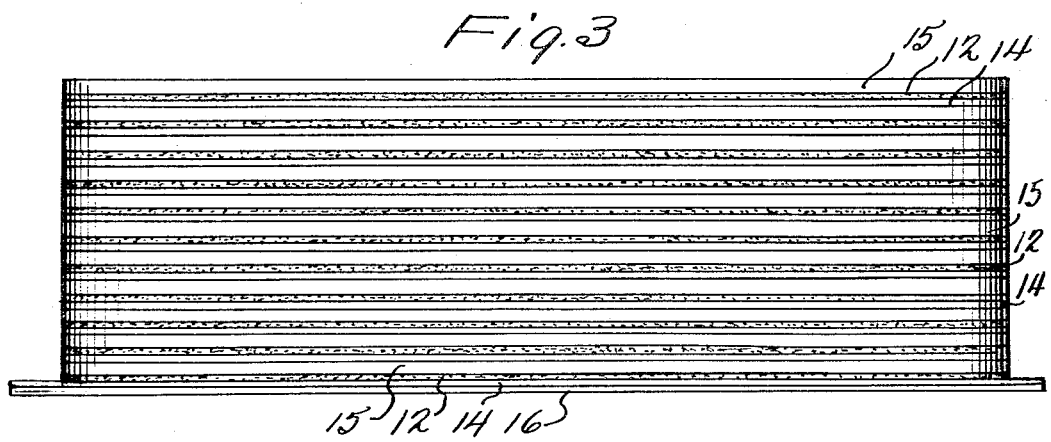
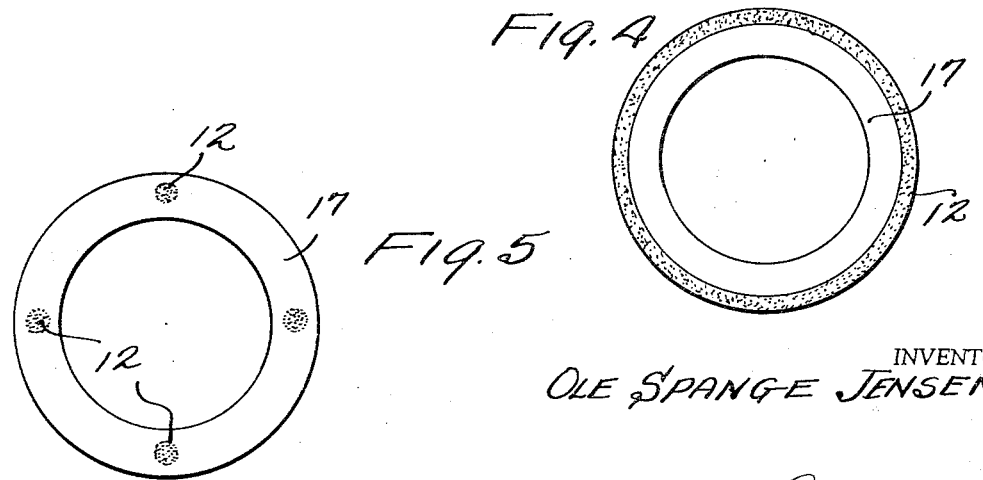
INVENTOR
OLE SPANGE JENSEN
BY Cushman, Darby & Cushman
ATTORNEYS

United States Patent Office 3,353,666
Patented Nov. 21, 1967

3,353,666
GASKET PACKAGE
Ole S. Jensen, Cherry Hill, N.J., assignor to Mundet Cork Corporation, North Bergen, N.J., a corporation of New York
Filed Oct. 11, 1965, Ser. No. 494,375
3 Claims. (Cl. 206—65)

ABSTRACT OF THE DISCLOSURE

There is provided a plurality of gaskets having an adhesive coating on an upper surface and a release coating on an under surface. These gaskets may be stacked and releasably bonded together by placing the adhesive coated surface of one gasket on the release coated surface of an adjacent gasket.

This invention relates to novel gaskets and more particularly to gaskets which can be easily stored, shipped and used.

Heretofore, gaskets are normally shipped from manufacturing plants to end users in relatively flexible packages, such as by wrapping in paper or in cardboard boxes. In the automotive industry, this has been a source of frequent difficulty because the gaskets would arrive in greatly distorted shapes and sometimes torn or otherwise damaged. Even when the gaskets are only slightly warped, they are frequently unsuitable for use in exact alignment and for producing a perfect seal. The use of strong containers, such as wooden boxes, for shipping the gaskets would be expensive and labor consuming.

It is, therefore, an object of the present invention to provide a novel gasket which can be easily shipped without warping or distortion.

It is another object of the invention to provide a novel gasket which can be shipped economically and requires a minimum of packaging.

Another object is to provide a gasket which can be used to produce an accurate alignment and excellent seal.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed descripition. Unless otherwise provided, all percentages are by weight.

It has now been found that the above objects can be accomplished by coating one side of a gasket with an adhesive composition and the other side of the gasket with an anti-adhesive or release composition. When so coated, the gaskets may be stacked to have the adhesive side of one gasket facing the release side of an adjacent gasket so that the gaskets will be in a releasable-adherent relationship.

When the gaskets of the present invention are shipped in a stacked relationship as described above, the adhesion between the adjacent gaskets will make the stack of gaskets a fairly rigid unit which resists distortion or warping. Thus, the various bracing devices presently being used in packaging gaskets can be eliminated.

Another advantage when using the gaskets of the present invention is that the adhesive-coated side of the gasket can be employed to maintain the alignment of the gasket with the flange during the working of the same. As an example, when a gasket is used to seal the oil pan to an automobile, the gasket is usually first put into position on the pan and then the combination turned over to fit onto the engine. In turning over the pan, the gasket frequently becomes dislodged and moved from the true alignment and causing difficulties and added labor. When the gaskets of the present invention are used, however, the adhesive coating may be employed to keep the gasket in place while the pan is turned or otherwise worked upon. Of course, it will be understood that the adhesive composition aids in securing an excellent seal between the parts to be joined by the use of the gasket.

The present invention may be carried out with gaskets made from any conventional gasket materials. Examples of these materials are composition cork, coated composition cork, rubber and cork, asbestos, rubber, paper, composition cellulose, Teflon (polytetrafluoroethylene), nylon, e.g. polyhexamethylene adipamide, and other plastic materials, coated fabrics, sponge rubber, etc. The only requirement is that gasket material should be sufficiently strong to withstand the small amount of tearing action which is present when a gasket is peeled from a stack made in accordance with the invention. This small amount of tearing action can be controlled to some extent by varying the amounts of adhesive composition and release coating applied to the gaskets.

For the adhesive composition, I preferred to use a so-called tacky or pressure-sensitive material. A wide variety of these pressure-sensitive adhesive compositions is well known and commercially available. A line of suitable adhesive compositions is the aqueous latices designated as Vultex and manufactured by General Latex and Chemical Corporation. These latices are substantially acrylic polymers. One of such latices, designated as Vultex 14–V–22, is particularly suitable for the purposes of the present invention and it is substantially a latex of poly-2-ethyl hexyl acrylate. Examples of other latices in this group which can be employed are Vultex 10–S–44 and Vultex 1–S–64. Another group of suitable adhesives is the Metrobond adhesives manufactured by Metro Adhesives Company. Examples of these adhesives are Metrobond Nos. 5040, 1651, 1550, 7041, and 5119. These adhesives have either a natural rubber latex base or a polyvinyl acetate or polyacrylic base. Synthetic rubber latices, e.g. butadiene-styrene copolymer latex can also be used. Depending on the use to which the adhesive-coated gasket is to be employed, the adhesive may be selected to have poor or excellent oil resistance, poor to good tack and adhesion, and low (about 150° F.) to relatively high (260° F.) softening point.

Normally, when a gasket is employed to seal a joint between two metal parts, a liquid composition is applied to the metal parts and/or to the gasket to produce a good seal. Lacquer is frequently employed in this regard. When the gaskets of the present invention are used, the pre-coated adhesive composition on one side of the gasket may serve the purpose of such a lacquer coating and additional adhesive may be unnecessary. Alternatively, the adhesives normally used in the installation of the gaskets may be applied onto the pre-coated adhesive surface.

The adhesive coating on the gasket of the invention need not cover the entire surface of the gasket. For the purpose of adhering the gaskets to each other for storage and transportation, only a part of one face of the gaskets needs be coated with adhesive to make a stack of the gaskets bond together into a rigid unit. On the other hand, the adhesive coating can be applied in a patterned or intermittent fashion when it is desired to have the gasket material in a continuous contact with the flanges.

Both the adhesive composition and the release coating can be applied to the gasket by any conventional means, e.g., dipping, brushing and roller coating, etc. These coatings can be easily dried by exposing them in the atmosphere. Alternatively, mild heat may be used to dry these coatings.

Various release compositions can be employed in the gasket of the present invention to achieve the desired result. The purpose of the release coating is to secure a releasable adhesion between adjacent gaskets in a package. The adhesion should be strong enough so that the package will withstand impact and other deforming forces as a unit and yet not so tenacious as to cause tearing when the gaskets are peeled apart. Suitable release compositions may contain as an active ingredient silicone or paraffin wax base. An example of a silicone is poly(dimethylsiloxane).

The invention will be further illustrated by the accompanying drawings in which:

FIGURE 1 is a perspective view, partly in section, of a gasket having coated thereon a layer of adhesive composition.

FIGURE 2 is an elevation view, partly in section, of the gasket shown in FIG. 1.

FIGURE 3 is an elevation view of a stack of gaskets made in accordance with the invention.

FIGURES 4 and 5 show gaskets of the invention having an adhesive layer thereon which does not cover the entire surface of the gasket.

In FIG. 1, a gasket made of cork is generally shown at 11. This gasket has a coating of an adhesive 12 on one surface thereof.

FIG. 2 shows an elevation view of the gasket in FIG. 1, partly in section, along lines 2—2. In this particular case, the gasket is made of a cork material 13 having a coating of adhesive 12 on the top surface thereof and a coating of releasing agent 14 on the other side of the gasket.

FIG. 3 shows a stack of gaskets made in accordance with the present invention which can be shipped without braces or other structural support. Starting at the top of this stack of gaskets, there is provided a gasket body 15 which can be made of any suitable materials as disclosed herein. On the lower surface of this gasket 15 there is coated a layer of an adhesive material 12 and this adhesive layer faces the release coating 14 coated on the next gasket 15. The adhesive layer 12 of the second gasket then faces the release coating 14 of the third gasket, and so forth. The last or lowest gasket in this stack has an adhesive layer 12 which is exposed and to prevent this exposed adhesive layer from sticking to packaging materials during shipping or storage, there is provided a sheet of heavy paper 16 on which there has been coated a layer of release composition 14. The release coating 14 on the sheet of paper 16 then faces the adhesive layer of the last gasket.

In FIG. 4, there is shown a circular gasket 17 on which there has been coated an adhesive layer 12 which completely encircles one surface of the gasket and yet does not entirely cover the surface. FIGURE 5 shows another variation of the embodiment of the invention where the adhesive layer only covers a portion of one surface of the gasket. From FIGS. 4 and 5 it can be gathered that a large number of patterns of adhesive layer are possible where the adhesive does not cover the entire surface of the gasket.

In the following examples, all percentages are by weight.

*Example I*

A conventional cork composition gasket for use in sealing the oil pan of an automobile was coated with Vultex 14–V–22 (a latex of poly-2-ethyl hexyl acrylate) on one side and a release composition the other side. The release coating had the following composition:

|  | Percent |
| --- | --- |
| Sodium alkyl sulfate | 4 |
| Silicone (Dow Corning 35) | 0.5 |
| Water | 95.5 |

The coatings were brushed on and allowed to be air dried. Enough of thus coated gaskets were then stacked together, with the adhesive side of one gasket facing the release side of the adjacent gasket, to a height of 24 inches. The last gasket in the stack had an adhesive side exposed and this was covered with a sheet of kraft paper having coated thereon a layer of the release composition.

This stack of gaskets was found to have excellent internal adhesion and able to withstand the handling and stress normally encountered without any deformation or damage. This was found to be so by shipping the stack of gaskets packaged without the bracing devices ordinarily used on the insides of such packages.

The stack of gaskets was then peeled apart one by one. There was no damage to the gaskets through this peeling process. The peeled gaskets had enough tack and adhesion to be positioned on a metal work-piece, a flange, and remain in position while the flange was moved and tilted.

*Example II*

Example I was repeated except that the adhesive composition was Metrobond No. 1651 (a polyvinyl acetate base pressure sensitive adhesive manufactured by Metro Adhesive Company) and the release coating had the following composition:

|  | Percent |
| --- | --- |
| Kwikaluminite No. 327 | 5 |
| Toluene | 95 |

Kwikaluminite is a paraffin wax base material. Results similar to those of Example I were obtained.

What is claimed is:

1. A stack of a plurality of gaskets releasably bonded together comprising a plurality of gaskets having a central portion thereof removed, each of the said gaskets having a pressure sensitive adhesive coated on the upper surface thereof at least along the periphery of the gaskets and a release coating on the under surface at least along the periphery of the gaskets, said gaskets being stacked together having the adhesive coated surface of one gasket facing and releasably adhered to the release coated surface of an adjacent gasket.

2. A stack of gaskets according to claim 1 wherein said pressure sensitive adhesive is selected from the class consisting of rubber latex adhesive, polyvinyl acetate latex adhesive and polyacrylic latex adhesive.

3. A stack of gaskets according to claim 1 wherein said release coating has as the principal active ingredient a member selected from the class consisting of silicones and paraffin wax base.

References Cited

UNITED STATES PATENTS

| 2,192,268 | 3/1940 | Lane et al. | |
| 2,209,210 | 7/1940 | Scholl. | |
| 2,248,317 | 7/1941 | Van Cleef. | |
| 2,256,024 | 9/1941 | Hill. | |
| 2,552,699 | 5/1951 | Warfield | |
| 2,565,509 | 8/1951 | Marcin. | |
| 3,056,154 | 10/1962 | Neal | 206—56 |
| 3,295,674 | 1/1967 | Shore | 206—56 |

LOUIS G. MANCENE, *Primary Examiner.*